United States Patent [19]

Van Gilder et al.

[11] Patent Number: 4,474,860

[45] Date of Patent: Oct. 2, 1984

[54] HIGH SOLIDS LATEXES FOR PAPER COATINGS

[75] Inventors: Ronald L. Van Gilder; Do I. Lee, both of Midland, Mich.

[73] Assignee: The Dow Chemical Company, Midland, Mich.

[21] Appl. No.: 494,750

[22] Filed: May 16, 1983

[51] Int. Cl.³ .............................................. B32B 27/10
[52] U.S. Cl. .................................. 428/511; 427/358; 523/220; 523/221; 524/526
[58] Field of Search ..................... 523/220, 221, 575; 524/526, 568, 558; 427/358; 428/511

[56] References Cited

U.S. PATENT DOCUMENTS

| | | | |
|---|---|---|---|
| 3,399,080 | 8/1968 | Vitkuske | 528/454 |
| 4,046,730 | 9/1977 | Tortal | 523/221 |
| 4,069,188 | 1/1978 | Canard et al. | 524/556 |
| 4,247,438 | 1/1981 | Eck et al. | 523/221 |
| 4,254,004 | 3/1981 | Abbey | 523/221 |
| 4,322,330 | 3/1982 | Merz et al. | 523/221 |
| 4,384,056 | 5/1983 | Schmidt et al. | 523/221 |
| 4,395,500 | 7/1983 | Lohr et al. | 523/221 |

OTHER PUBLICATIONS

Research Disclosure 18905 (Published Jan. 10, 1980).

*Primary Examiner*—Lewis T. Jacobs
*Attorney, Agent, or Firm*—August J. Borschke

[57] ABSTRACT

Bimodal latexes having two separate and distinct particle size distributions have high solids content, good high shear rheology and good low shear viscosity. These bimodal latexes, e.g., styrene/butadiene/acrylic acid/itaconic acid latexes are employed in coating paper in conjunction with a mineral filler using a coating device such as a blade coater to yield high quality coatings which can be easily applied.

14 Claims, No Drawings

HIGH SOLIDS LATEXES FOR PAPER COATINGS

BACKGROUND OF THE INVENTION

This invention relates to latexes and latex coatings.

Paper is often filled with mineral fillers such as clay, calcium carbonate and titanium dioxide. Such fillers are used to increase the opacity of the paper product. It is also advantageous to employ coatings and/or binders in the paper making process. For example, synthetic latexes or natural binders such as proteins or starch are employed as coatings alone or as components of pigmented coatings to increase the strength of the paper. The use of synthetic latexes as binders has become popular due to the desirable properties exhibited by said latexes.

Coatings are often applied to continuous web materials such as paper through the use of a high speed coating devices. For example, when a blade coater is employed, the properties of the coating which is applied to the paper can be varied by altering the blade thickness or the blade angle of the coater, the amount of pressure employed in forcing the coating material through the blade, or the rheology of the coating itself.

It is desirable that latexes which are applied using coating devices remain as discrete, stable, free moving particles in order to obtain trouble-free runability. However, when a latex containing coating formulation is subjected to high shear, such as, for example, in a blade coater, the formulation can exhibit a shear thinning or shear thickening behavior. Shear thickening can be reduced by decreasing the solids content in the coating formulation. Although a reduction in the amount of solids will improve the runability of the formulation, the quality of the resulting coating can be adversely affected by low coating weight or excess "diving in" of the coating into the paper substrate. It is desirable to have greater coating "hold-out" on the surface of the paper so as to achieve paper exhibiting improved printing quality.

Coating formulations which are increasingly high in solids facilitate the production of high quality coatings. Typically, high solids coatings are obtained by adding dry pigment to pigment slurries. However, a high solids latex reduces or eliminates the need for dry pigment addition. In addition, high solids coatings are desirable in increasing production rates and reducing energy costs. High solids versions of conventional latexes are limited to their use as paper coatings due to the resulting high coating formulation viscosity at high shear rates. This leads to poor blade coater runability. Typically, poor runability is characterized by scratching or streaking of the coating, or lack of coat weight control (i.e., very high weight coatings and/or uneven coatings).

In view of the deficiencies in the prior art, it would be highly desirable to provide a means of preparing a paper coated with a formulation comprising a high solids synthetic latex which exhibits good runability during application with a device such as a blade coater.

SUMMARY OF THE INVENTION

The present invention is an improved high solids formulation for coating paper which comprises an aqueous medium having dispersed therein a functionally effective amount of a finely divided mineral filler and a high solids synthetic bimodal latex comprising two separate and distinct particle size distributions; wherein each of said distributions comprises particles which are substantially uniform in diameter such that said latex, when mixed with said filler in said aqueous medium, provides a coating formulation which approaches a viscosity which is no longer manageable at a higher solids content than that solids content exhibited by a formulation comprising an aqueous medium, a filler and a monodisperse or highly multi-disperse latex. The small latex particles of said distribution of the bimodal latex provides an increase in the solids content and a decrease in viscosity at high shear of the formulation over that of a formulation comprising a monodisperse latex of a particle size similar to that of the large latex particle distribution of the bimodal latex. The large latex particle distribution of the bimodal latex increases the solids content of the formulation at low shear over that of a formulation comprising a monodisperse latex of a particle size similar to that of the small latex particle distribution of the bimodal latex.

In another aspect, the present invention is a process for coating paper which comprises applying the formulation of this invention to said paper using a coating device. In yet another aspect, this invention is a coated article comprising a fibrous sheet continuously coated on at least one surface with the formulation of this invention.

The process of this invention yields improved coating compositions which are high in solids and thus provide a high quality paper. In addition, the process of this invention provides a method for easily applying latex coatings to paper due to the low viscosity, good runability and good high shear rheology provided by the bimodal latex.

For purposes of this invention, the term, "high solids" is used in referring to a formulation comprising a dispersed phase and a continuous phase wherein the volume fraction of the dispersed phase approaches the limit at which the formulation no longer exhibits a manageable viscosity. Similarly, by the term, "latex with a high solids content" is meant a latex formulation comprising latex particles in amounts such that the formulation approaches the limit at which said formulation no longer exhibits a manageable low shear viscosity. Similarly, by the term, "high solids coatings" is meant a coating formulation which can comprise solids such as natural binders, clays, synthetic latexes, etc. which, for a particular formulation, contains solids in amounts such that the formulation approaches a limit at which said formulation no longer exhibits a manageable high shear viscosity. By the term "viscosity which is no longer manageable" is meant that the formulation is too thick to handle and use in standard paper coating procedures.

DETAILED DESCRIPTION OF THE INVENTION

The bimodal latex of this invention comprises a proportion of large size latex particles and a proportion of small size latex particles. It is desirable to employ large size particles whose diameter is in the range of from about 2.5 to about 10, most preferably from about 3 to about 4, times that diameter of the small size particles. It is also desirable that the weight percentage of large size particles in the latex formulation exceed the weight percentage of the small size particles. For example, a styrene/butadiene latex composition comprising from about 50 to about 98, preferably from about 60 to about 80, weight percent large size particles and from about 2 to about 50, preferably from about 20 to about 40, weight percent small size particles can be used. It is understood that the proportion of large size particles and the proportion of small size particles, the size distribution of particles, and the amount of solids in the formulation employed can depend on the particular latex which is employed and/or the particular coating device which is employed.

The large size latex particles can vary in size from about 1500 Å to about 10,000 Å, more preferably from about 1800 Å to about 3000 Å in diameter. The small size latex particle can vary in size from about 500 Å to about 1000 Å, more preferably from about 600 Å to about 800 Å in diameter.

The latex particles of this invention are prepared from combinations of monomers such that the resulting particles have sufficient adhesive properties for paper coating binding applications. Virtually any latex that can be used as a paper coating binder and can be prepared are a bimodal composition can be employed. It is also desirable that the latex be carboxylated in order to increase colloidal stability and, hence, the degree of binding efficiency to the paper and pigments. Representative momomers useful in preparing the latexes of this invention and methods for preparing the individual separate particles are described in U.S. Pat. Nos. 3,404,116 and 3,399,080, which is incorporated herein by reference. Other monomers suitable for preparing the latexes of this invention can include the olefins such as ethylene and propylene, as well as monomers such as vinyl chloride and vinylidene chloride. Especially preferred latexes include modified styrene/butadiene latexes such as, for example, styrene/butadiene/acrylic acid, styrene/butadiene/acrylic acid/itaconic acid, styrene/butadiene/vinylidene chloride, styrene/butadiene/β-hydroxyethyl acrylate and/or styrene/butadiene/β-hydroxyethlacrylate/acrylic acid. In the preparation of the latexes, it is also desirable to use a relatively small polymer particle (e.g., a "seed" latex) in initiating particle formation. The latexes having separate and distinct particle sizes are then blended together to yield a bimodal latex. Alternatively, bimodal latexes can be prepared by intermediate addition of a seen latex during a conventional emulsion polymerization process.

The process of this invention offers a balance between two desirable properties. It is desirable that the runability of the latex be good for easy and effective application using a coating device. That is, it is desirable that the viscosity of the latex be low at high rates of shear. This is generally accomplished by employing latexes in a small particle size range. However, it is also desirable that the latex be of high solids. High solids latexes typically are composed of particles of relatively large size and that have a broad particle size distribution. However, such large size particles do not exhibit a tendency to move well relative to one another under conditions of high shear. On the other hand, the bimodal latex exhibits high solids content with an acceptably high low shear viscosity. For purposes of this invention, "low shear" means shear rates of less than about 1000 sec$^{-1}$. Conversely, by "high shear" is meant shear rates of more than about 10,000 sec$^{-1}$. Typically, the use of a bimodal latex, as described herein, as in a coating formulation results in superior coating runability over that of the corresponding large monodisperse particle size latex. As a result, higher coating formulation solids can be used with the bimodal latexes than those prepared with the corresponding monodisperse latex. In addition, the bimodal latexes yield coating formulations which exhibit coating runability (i.e., low viscosity at high shear) which is comparable or better than that of a conventional small particle size, monodisperse latex.

Coating formulations of this invention comprise an aqueous medium, an amount of a finely divided mineral filler and a bimodal latex. Examples of mineral fillers include those known in the art such as clay, titanium dioxide, etc. The amount of filler which is employed can vary, depending upon the density of the filler and the coating properties desired. Typically, coating formulations comprise about 100 parts filler and about 2 to about 20, preferably about 14 to about 18, parts of bimodal latex by weight. Each of the aforementioned components is mixed in an aqueous medium to yield a formulation which is about 60 to about 75 percent solids by weight. Typically, coating formulations of this invention are at least about 1 percent higher in solids than those formulations comprising monodisperse or highly multi-disperse latexes and exhibiting comparable viscosities. It is also understood that other additives known in the art which include cobinders, thickeners, water retention aids and the like can be added to the coating formulation. Such additives are disclosed in the aforementioned U.S. Pat. No. 3,399,080.

The coatings as described herein are most desirably applied to the paper through coating devices such as blade coaters which are described in *Coating Equipment and Processes,* O. L. Booth, Lookwood Publishing Co., Inc., 1970. The process of this invention yields an improved method of applying latex coating formulations to paper, for example, as binders, colorants, etc. Other methods for applying coatings to paper can include the use of coating devices such as air knife coaters, rod coaters, roll coaters, and the like, which are described in the aforementioned reference.

Bimodal latexes are most advantageously employed as excellent coatings for paper. However, such latexes can also be employed in a wide variety of end-use applications such as in coating formulations such as paints, as impregnants, and in adhesive compositions. In such instances, the bimodal latexes are suitably employed pursuant to known techniques and procedures which are conventionally employed with other types of latexes in the chosen type of end-use application.

The following examples are given for the purpose of illustrating the present invention and are not to be construed as limiting its scope. Unless otherwise indicated, all parts and percentages are by weight.

EXAMPLE 1

Latexes comprising 63 percent styrene, 35 percent butadiene and 2 percent acrylic acid/itaconic acid are prepared to obtain the desired monodisperse size or blended to obtain the desired bimodal particle size and distribution. The individual latexes or blends of latexes are concentrated using a rotary laboratory evaporator. To each of the latex formulations is added sufficient sodium hydroxide solution until the pH of the carboxylated latex is 7. The low shear viscosity of each latex formulation is measured at 20 rpm with a No. 3 spindle on a Brookfield RVT viscometer at 22° C. after the concentrated latex formulation has been diluted with sufficient deionized water to yield samples having viscositites of 1000 and 1500 cps. The percent solids for each of the latex formulations at a viscosity of 1000 and 1500 cps is presented in Table I.

Each of the concentrated latex formulations prepared as described above is blended with Hydrafine ™ No. 1 clay (which has been blended with 0.1 part tetrasodium pyrophosphate and a sodium acrylate dispersant per 100 parts clay to ensure adequate dispersion) in the amount of 14 parts latex solids per 100 parts clay, adjusted to a pH of 8.5 using a sodium hydroxide solution, and compounded to yield a mixture which is 67.5 percent solids. The nonequilibrium instantaneous viscosities of each of the formulations are measured with the E bob of a Hercules high shear viscometer at the maximum rpm of 4400 (i.e., a shear rate of 45850 sec$^{-1}$). The viscosity of each formulation at maximum high shear is measured. Results are presented in Table I.

Each of the latex-clay formulations is diluted incrementally with deionized water until the apparent viscosity at maximum high shear is comparable. That is, the amount of solids in each formulation is decreased to obtain a maximum high shear apparent viscosity of 34 cps. Results are presented in Table I.

TABLE I

| Sample | Latex Particle Size[1] | Distribution[2] | Percent Solids at: 1000 cps | Percent Solids at: 1500 cps | Viscosity at High Shear[3] (cps) | Percent Solids at High Shear[4] |
|---|---|---|---|---|---|---|
| 1 | 2100/720 | 60.3/39.7 | 59.5 | 60.3 | 61 | 65 |
| 2 | 2100/720 | 76.8/23.2 | 60.9 | 62.1 | 65 | 64.5 |
| 3 | 2100/720 | 90.5/9.5 | 59.7 | 60.6 | 77 | 64.0 |
| C-1* | 720 | — | 50.2 | 51.0 | 45 | 66 |
| C-2* | 1324 | — | 55.3 | 56.6 | 60 | 64.5 |
| C-3* | 2100 | — | 59.1 | 59.5 | 85 | 63.3 |

*Not an example of the invention.
[1] Latex particle size reported in Å for bimodal and monodisperse formulations.
[2] Distribution is number of particles of large size latex to number of particles of small size latex for each of the bimodal formulations.
[3] A representation of the viscosity at high shear using comparable coating color solids of 67.5 percent.
[4] A representation of the amount of solids in a latex-clay formulation to yield an apparent viscosity of 34 cps at a high shear. That is, the amount of solids for comparable runability is represented.

The data in Table I indicates that the bimodal formulations (Sample Nos. 1–3) yield higher amounts of solids than the corresponding monodisperse latex formulatins at low shear. The data also indicates a better balance of desirable properties such as high solids and good runability. For example, sample C-1 has a very low viscosity at high shear (which indicates good runability). The solids content of Sample No. C-1 is quite high at high shear but the solids content at low shear is very low. Conversely, Sample No. C-3 exhibits what could be considered poor runability but at a relatively low solids content at high shear. Conversely, Sample Nos. 1–3 exhibit both relatively low viscosities at high shear and relatively high solids content. This indicates good high shear rheology.

EXAMPLE 2

Latexes are prepared, blended and concentrated as described in Example 1. The pH of each latex formulation is adjusted to 7 using a sodium hydroxide solution. The concentrated latex formulation is blended with Hydrafine ™ No. 1 clay in the amount of 14 parts latex solids per 100 parts clay. Each latex-clay formulation is compounded to a level of 68 percent solids.

Apparent viscosities of each of the formulations is measured at high shear as described in Table II. Results are presented in Table II. Each formulation is diluted with deionized water, as described in Example 1, to yield a viscosity of 34 cps at maximum high shear. Results indicating the percent solids at such high shear are presented in Table II.

Each of the latex-clay formulations is applied as a coating to a ground wood free publication paper using a Black Clawson Co. coating machine equipped with a trailing blade. Each formulation is applied using full blade pressure and a line speed of 700 feet per minute. The amount of latex-clay coating for each formulation per 3300 square feet of paper is presented in Table II.

TABLE II

| Sample | Latex Particle Size[1] | Distribution[2] | Viscosity (cps) at High Shear[3] | Percent Solids at High Shear[4] | Coat Weight (Lb/3000 Ft$^2$) |
|---|---|---|---|---|---|
| 4 | 2120/720 | 75.1/24.9 | 90 | 67.5 | 5.42 |
| 5 | 1972/670 | 60/40 | 75 | 67.9 | 4.96 |
| C-4* | 2103 | — | 109 | 66.6 | 6.11 |
| C-5* | 1410 | — | 74 | 67.8 | 4.66 |

*Not an example of the invention.
Notes [1] through [4] same as in Table I.

The data in Table II indicates a good balance of desirable properties such as good runability, high solids, and good coat weight for Sample Nos. 1 and 2, indicating good high shear rheology. Although Sample No. C-4 exhibits extremely poor runability due to its large, monodisperse particle size, and the amount of solids at high shear is relatively low, however, the coat weight is very high. This high coat weight indicates a rough, uneven coating. Sample No. C-5 exhibits a very low coat weight.

What is claimed is:

1. An improved hight solids formulation for coating paper which comprises an aqueous medium having dispersed therein a functionally effective amount of a finely divided mineral filler and a high solids synthetic bimodal latex comprising two separate and distinct particles size distributions and comprising in polymerized form open chain conjugated diene and alkenyl mononuclear aromatic monomers; wherein each of said distributions comprises particles which are substantially uniform in diameter such that said latex, when mixed with said filler in said aqueous medium, provides a coating formulation which approaches a viscosity which is no longer manageable at a higher solids content than that solids content exhibited by a formulation comprising an aqueous medium, a filler and a monodisperse or highly multi-disperse latex; whereby the small latex particles of said distribution of the bimodal latex provide the capability to provide an increase in the solids content and a decrease in viscosity at high shear of the formulation over that of a formulation comprising a monodisperse latex of a particle size similar to that of the large latex particle distribution of the bimodal latex; and whereby the large latex particles of said distribution of the bimodal latex provide the capability to increase the solids contend of the formulation at low shear over that of a formulation comprising a monodisperse latex of a particle size similar to that of the small latex particle distribution of the bimodal latex.

2. A formulation of claim 1 wherein the latex has a particle size of said two separate and distinct distributions are in the range from about 500 Å to about 1000 Å and from about 1500 Å to about 10,000 Å in diameter, respectively.

3. A formulation of claim 1 comprising a bimodal latex comprising styrene/butadiene, styrene/butadiene/acrylic acid, styrene/butadiene/vinylidene chloride, styrene/butadiene/β-hydroxyethyl acrylate, styrene/butadiene/β-hydroxyethlacrylate/acrylic acid and/or styrene/butadiene/acrylic acid/itaconic acid latexes.

4. A formulation of claim 1 comprising a styrene/butadiene/acrylic acid/itaconic acid bimodal latex.

5. A process for coating paper which comprises applying the formulation of claim 1 to paper.

6. A process for coating paper which comprises applying the formulation of claim 1 to paper using a blade coater.

7. A coated article comprising a fibrous sheet continuously coated on at least one surface with the formulation of claim 1.

8. A formulation of claim 1 wherein the latex has a particle size of said separate and distinct distributions are in the range from about 600 Å to about 800 Å and from about 1800 Å to about 3000 Å in diameter, respectively.

9. A formulation of claim 1 wherein the diameter of the large latex particles range from about 2.5 to about 10 times the diameter of the small latex particles.

10. A formulation of claim 1 wherein the diameter of the large latex particles range from about 3 to about 4 times the diameter of the small latex particles.

11. A formulation of claim 1 wherein said bimodal latex comprises from about 50 to about 98 weight percent large size particles and from about 2 to about 50 weight percent small size particles.

12. A formulation of claim 1 wherein said bimodal latex comprises from about 60 to about 80 weight percent large size particles and from about 20 to about 40 weight percent small size particles.

13. A formulation of claim 1 wherein said formulation has a solids content of from about 60 to about 75 weight percent based on the total weight of the formulation.

14. A formulation of claim 13 wherein said solids content comprises about 100 parts filler and from about 2 to about 20 parts bimodal latex.

* * * * *